(12) United States Patent
Georgiev

(10) Patent No.: US 6,351,269 B1
(45) Date of Patent: Feb. 26, 2002

(54) MULTIPLE IMAGE MORPHING

(75) Inventor: Todor Georgiev, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/062,523

(22) Filed: Apr. 17, 1998

(51) Int. Cl.$^7$ ................................................ G09G 5/00
(52) U.S. Cl. ...................................................... 345/629
(58) Field of Search ................................ 345/435, 433, 345/434, 436, 418, 334

(56) References Cited

PUBLICATIONS

T.Georgiev et al., "Morphing Between Multiple Images," S.Illinois Univ. at Cardbondale dept. of Comp. Science, Technical Report, p. 17, Apr. 17, 1997.
T.Georgiev, "Morphing Between Multiple Images: Theory and Applications," Thesis, S.Illinois Univ. at Cardbondale Dept. of Comp. Science, p. 45, Jun. 1997.
Seungyong Lee et al., "Polymorph: Morphing Among Multiple Images," IEEE, 60–73, 1998.
Todor Georgiev, "Movie Compression and Motion Editing by Multi–Image Morphing," 20 pgs. 1997.
Jain et al., "Algorithms for Clustering Data," Prentice hall, Englewood Cliffs, NJ, 24–36, 1988.
Turk et al., "Eigenfaces for Recognition," Massachusetts Institute of Technology, Journal of Cognitive Neuroscience vol. 3,No.1, 72–86, 1991.
Devijver et al., "Pattern Recognition: a Statistical Approach," Prentice Hall International, 301–341, 1982.
George Wolberg, "Digital Image Warping," IEEE Computer Society, 41–65, 1990.
Klaus et al., "Robot Vision," The MIT Electrical Engineering and Computer Science Series, 279–95, 1986.
Johnson et al., "Applied Multivariate Statistical Analysis," University of Wisconsin–Madison, Prentice–Hall, Inc., 361–388, 1982.
Beymer et al., "Example Based Image Analysis, and Synthesis" Massachusetts Institute of Technology Artificial Intelligence Laboratory, Memo No. 1431, Paper No. 80, 21 pgs., Nov. 1993.
Seitz et al., "View Mrophing," Department of Computer Sciences University of Wisconsin–Madison, 10 pgs., 1986.
"Motion Field & Optical Flow," Motion Field 12, 279–295.
Wolberg, "Spatial Transformations," Chapter 3, 41–65, 1990.

*Primary Examiner*—Cliff N. Vo
(74) *Attorney, Agent, or Firm*—Fish & Richardson P.C.

(57) ABSTRACT

A computer-implemented method for morphing among multiple images uses as inputs a predetermined set of coefficients and a plurality of warping functions. Each image defined by a plurality of points in a first space and each point has a color. The method generates a derived warping function, determines an inverse of the derived warping function, warps each image to the first image, blends the colors using the predetermined set of coefficients, applies the inverse of the derived warping function to points in the first space to generate a warped image, and applies the blended color to the warped image.

24 Claims, 5 Drawing Sheets

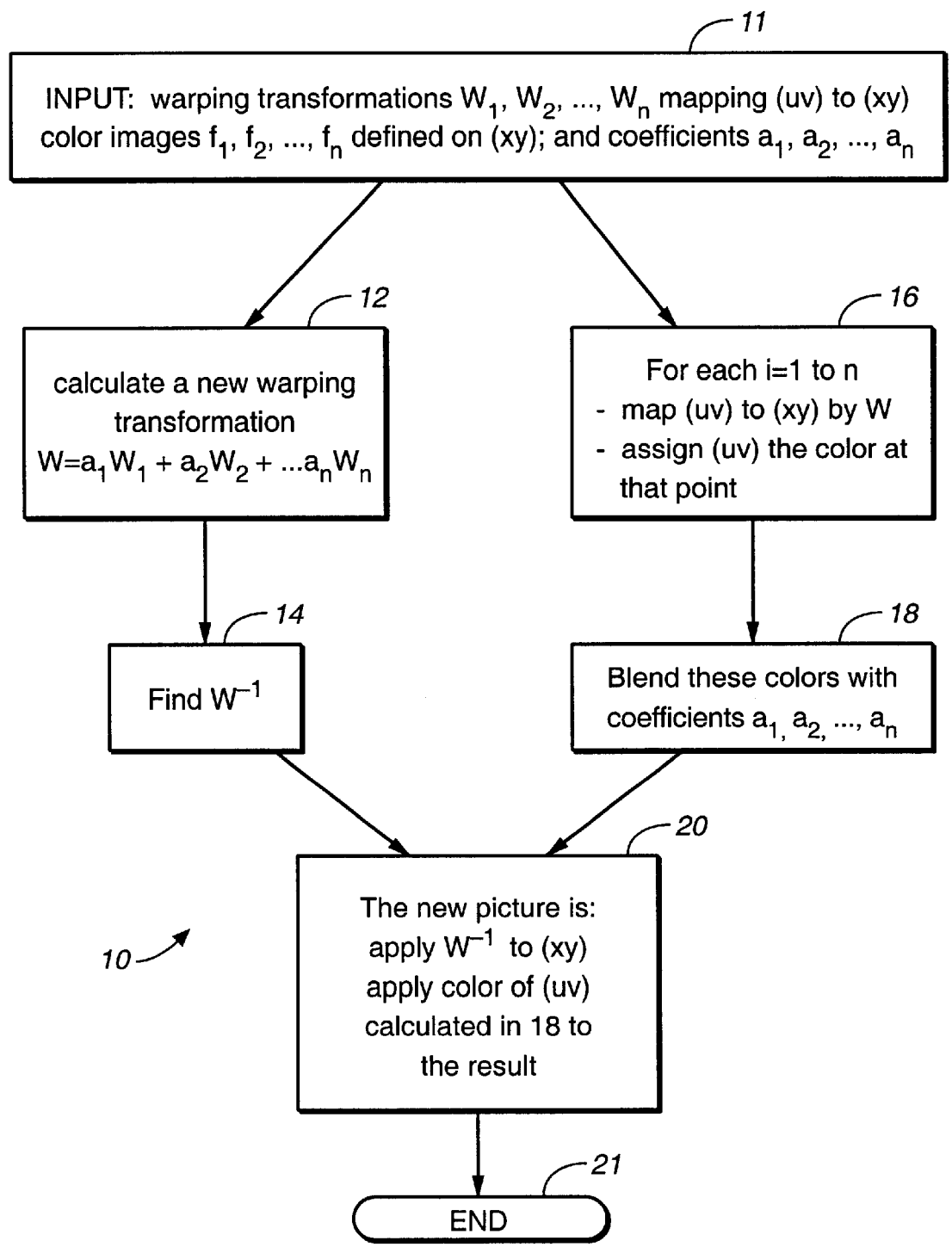
FIG._1

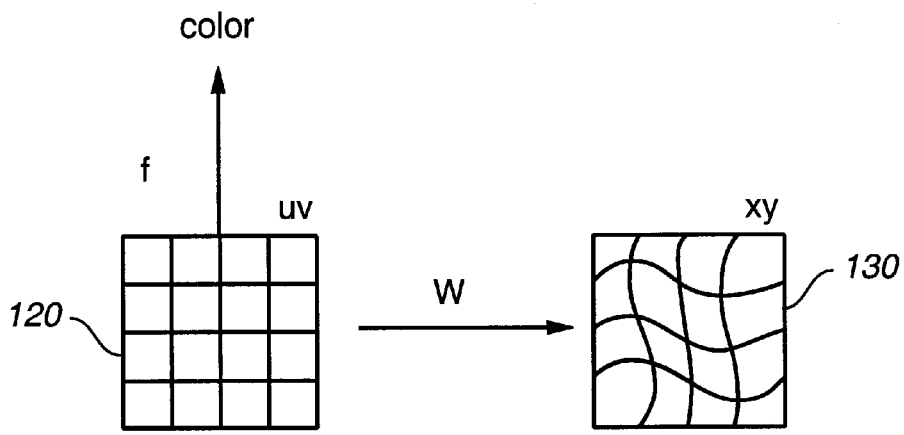
FIG._2
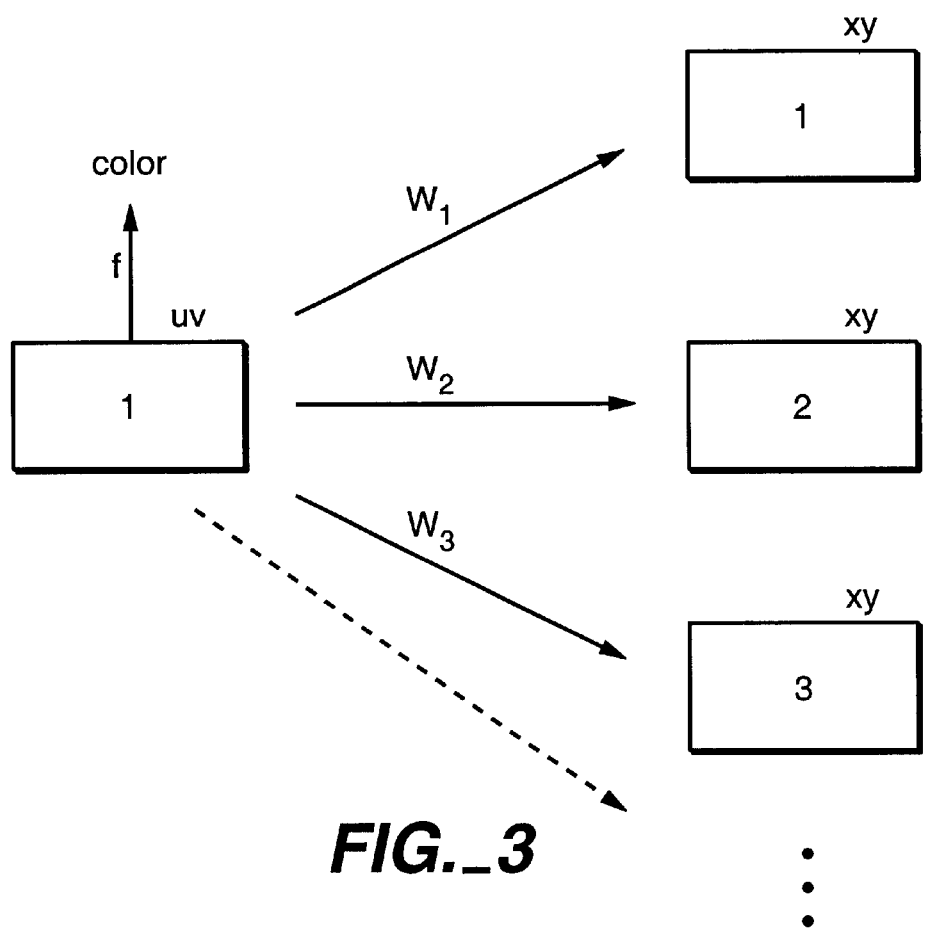
FIG._3

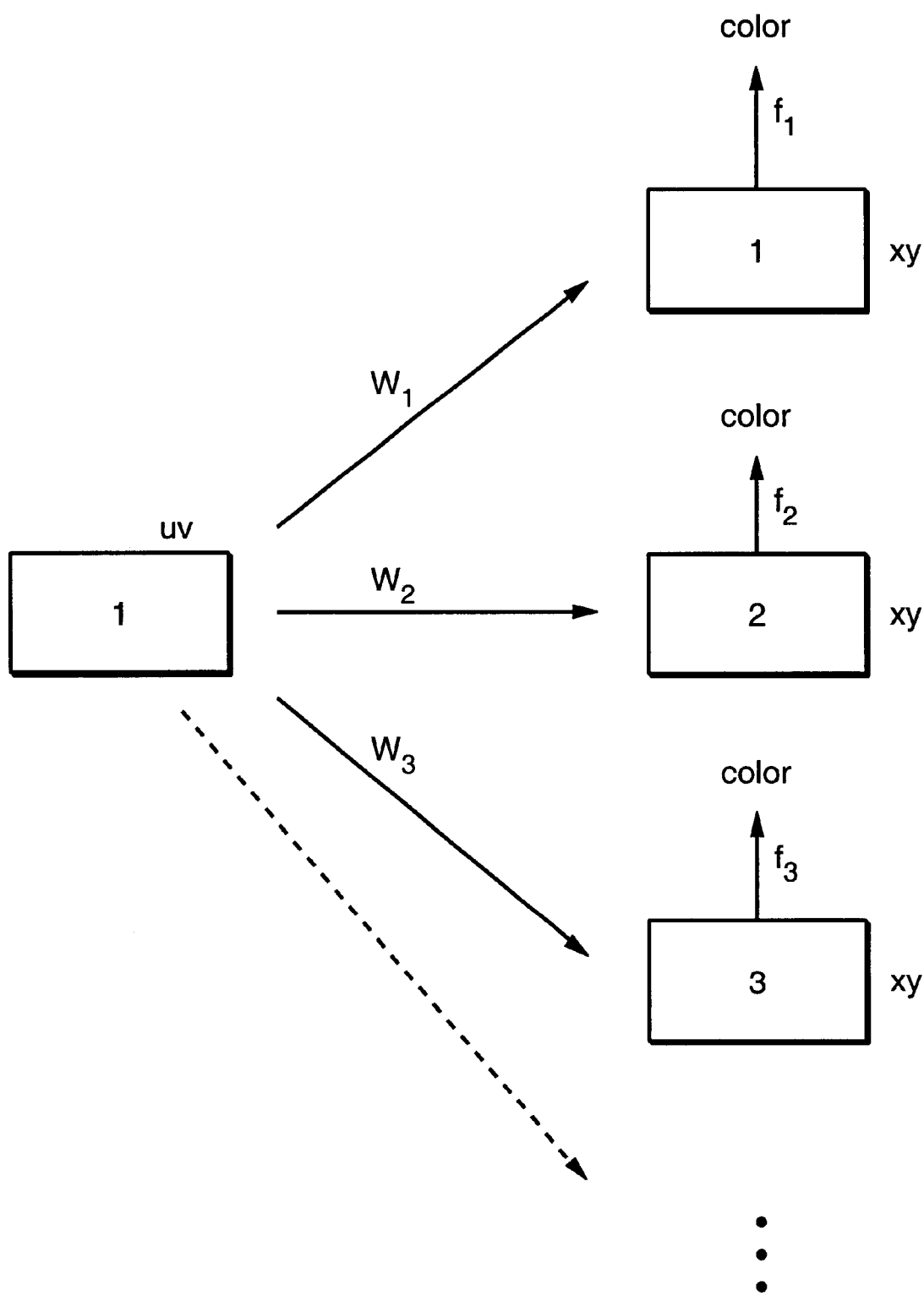
FIG._4

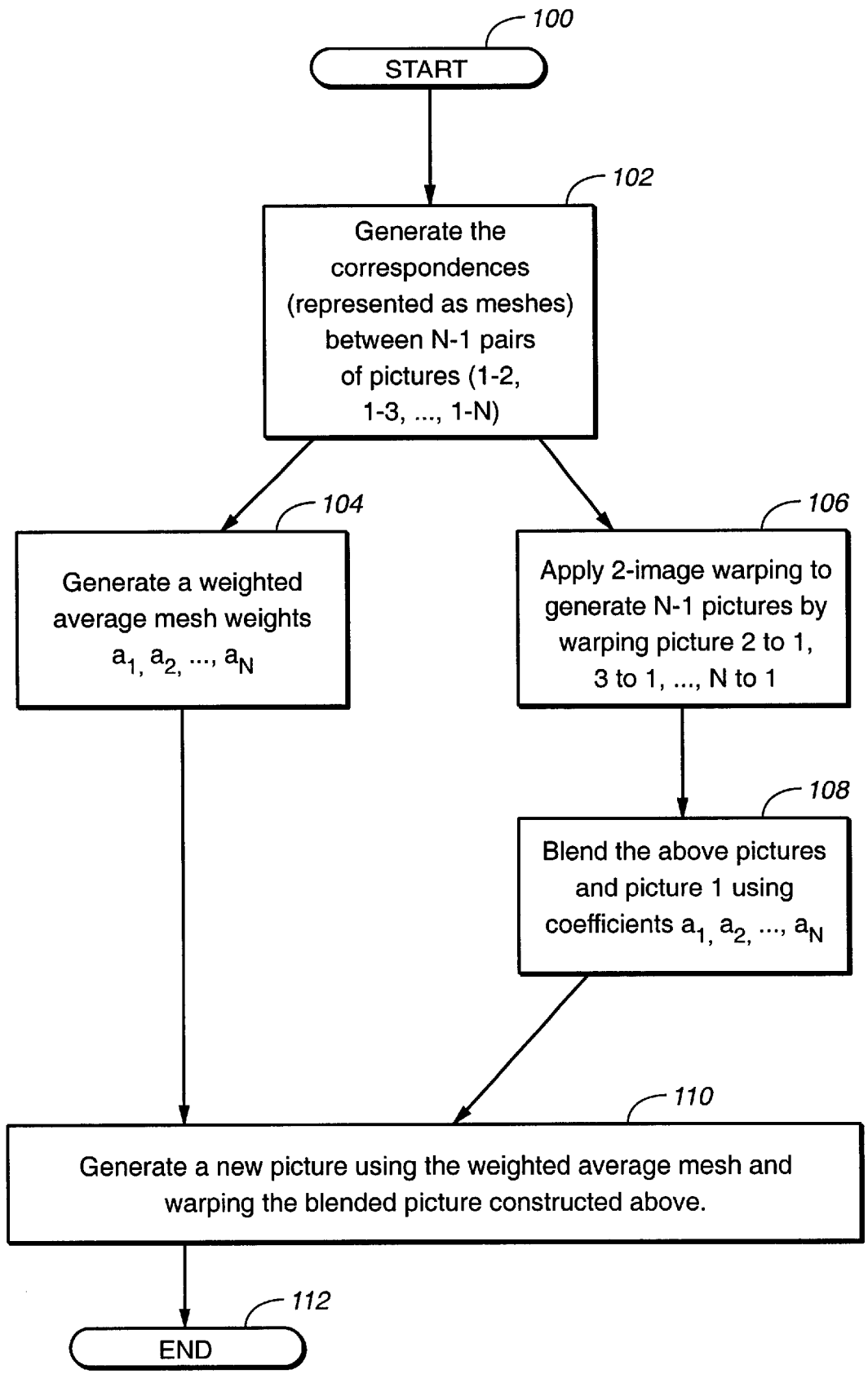
FIG._5

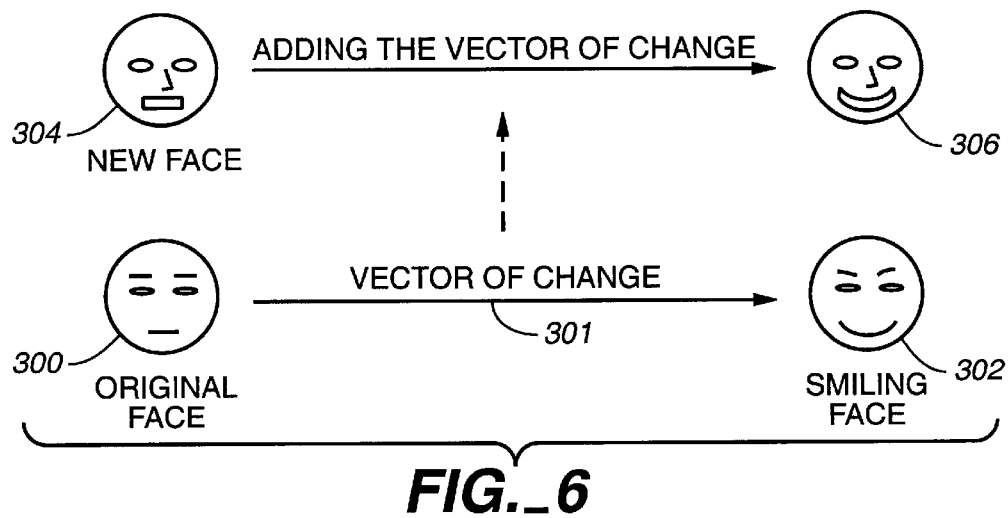
FIG._6
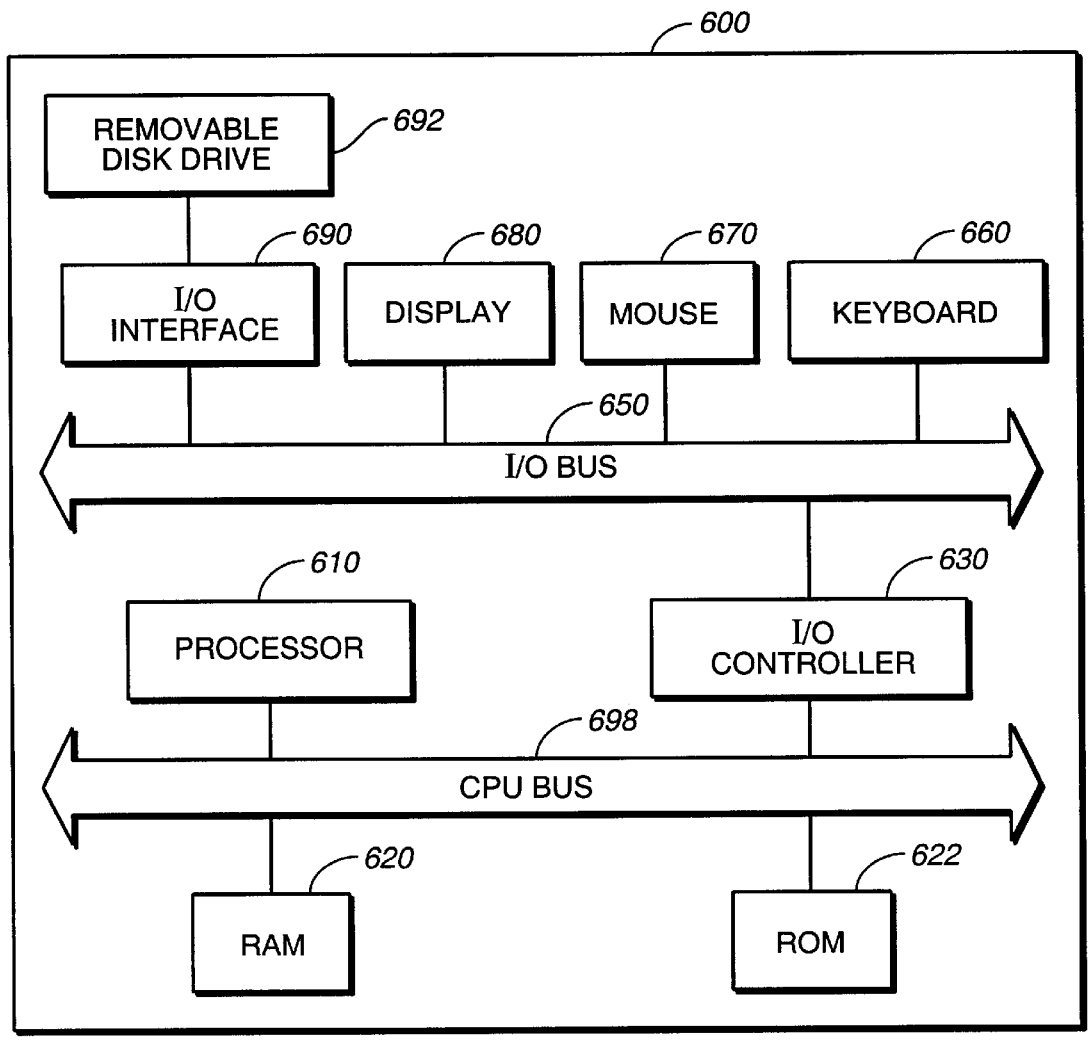
FIG._7

MULTIPLE IMAGE MORPHING

BACKGROUND

One type of special effect in computer graphics is known as morphing. The morphing operation changes one picture to another by creating a smooth transitional link between the two pictures. The process preserves features associated with each image by mapping the features from a source image to corresponding features in a destination image. Although the user interface may vary in the morphing software, the internal handling of data is similar. In one version of the conventional morphing process, given two pictures, key points defining correspondences between the pictures can be identified by selecting a first point in a first picture and a corresponding point on a second picture. The process is then repeated for the remaining key points for the two pictures. The key points on the first picture are then connected together to form a fine mesh which may be small triangles or quadrilaterals. The same mesh appears on the other picture, but deformed in accordance with one or more functions to produce a "warped" or "deformed" image.

SUMMARY

A computer-implemented method for morphing among multiple images is provided. The invention uses as inputs a predetermined set of coefficients and a plurality of warping functions. Each image defined by a plurality of points in a first space and each point has a color. The method generates a derived warping function, determines an inverse of the derived warping function, warps each image to the first image, blends the colors using the predetermined set of coefficients, applies the inverse of the derived warping function to points in the first space to generate a warped image, and applies the blended color to the warped image.

Implementations of the invention include the following. Each warping function is defined by meshes. The number of images may be n, where n is greater than 2. The predetermined set of coefficients sum up to one and further, may be functions. Change vectors may be generated for pairs of images and applied to another image by using predetermined weights. The change vectors may be used to automatically generate movies. Moreover, a new character may be generated from an existing character in a movie by applying the change vector. The invention may also be used to transport gestures and facial expressions from an image of one person to another. Further, the invention can convert black-and-white pictures to colored pictures using the change vector.

Advantages of the invention include the following. The n-image morphing allows a user to achieve precise control over the final results by appropriately selecting the n pictures and coefficients.

BRIEF DESCRIPTION OF THE DRAWINGS

FIG. 1 is a flow chart of a process for morphing among multiple images.

FIG. 2 is a diagram illustrating warping.

FIG. 3 is a diagram illustrating multi-image warping.

FIG. 4 is a diagram illustrating multi-image morphing.

FIG. 5 is a flow chart of a process for morphing among multiple images using meshes.

FIG. 6 is an example illustrating the operation of the invention in transporting facial expressions between two persons.

FIG. 7 is a diagram of a computer system.

DESCRIPTION

Referring now to FIG. 1, a process 10 for morphing among multiple images is shown. The process 10 receives as input a plurality of warping mappings $W_1, W_2, \ldots, W_n$ which map points located in a second space (uv space) to points located in a first space (xy space) (step 11). The process operates on a plurality of images, each image consisting of a plurality of points in the first space each point with associated color defined by a function $f_i$ on the first space, where the index i ($1 \leq i \leq n$) enumerates all images. The process also receives as input a set of coefficients $a_1, a_2, \ldots, a_n$ which parameterize the morph.

The process 10 generates a new warping function W based on the coefficients $a_1 \ldots, a_n$ and the warping functions $W_1 \ldots W_n$ (step 12). Each warping function $W_i$ maps the points of the second space to points on the first space. Here, $W = a_1 W_1 + a_2 W_2 + \ldots + a_n W_n$.

Next, an inverse mapping $W^{-1}$ of the warping function W is determined (step 14). $W^{-1}$ maps the points of the first space to the second space. Concurrent with steps 12 and 14, the process warps the original pictures (step 16). $W_1$ in this case is chosen to be the identity mapping. Step 16 can be described as repeating n times the following 2 steps:

1. Using $W_i$, map each point in the second space into the first space.

2. Each point on the first space has a color $f_i$ from the $i^{-th}$ picture. Take this color and assign it to the starting point in the second space.

Next, the process 10 blends the above n colors by constructing the weighted average with weights $a_1 \ldots a_n$ (step 18).

Finally, in step 20 the process 10 generates a new picture on the first space by applying the inverse of the warping function to the points in the first space and then assigning to them the colors calculated in step 18.

FIGS. 2–4 show the process 10 in more detail. In FIG. 2, the warping of one picture 120 is shown. The warping process differs from the morphing process in that the warping process does not affect the color of the image. The picture may be expressed as a function f which assigns a color to each pixel in the uv space. The picture 120 is warped into a picture 130 with coordinates (x, y) in the xy space. The picture 130 is produced by assigning a color to each pixel in the xy space applying $W^{-1}$ and then the function f.

FIG. 3 describes multi-image warping. Given n warping transformations $W_1, \ldots W_n$ from uv space to xy space and one picture f on the uv space, a multi-image warping operation is performed by applying an inverse mapping $(a_1 W_1 + a_2 W_2 + a_3 W_3 + \ldots)^{-1}$ to (x,y) and then applying f.

This process is called multi-image warping because $W_i$ are assumed to be derived from or associated with correspondences between n images, although only one of these images is used for the color of the final warp.

FIG. 4 describes the multi-image morphing process 10. In this process, the inverse mapping $(a_1 W_1 + a_2 W_2 + a_3 W_3 + \ldots a_N W_N)^{-1}$ is applied to (x,y). A new f is then applied. Stated in pseudocode, the new function f is:

for each point (u,v), apply $W_i$ then apply fi and take this color times coefficient $a_i$, and add the results together. This is a picture in the second space (uv space).

The processes shown in FIGS. 1 and 4 may be expressed mathematically as:

$$morph = (a_1 f_1 \circ W_1 + a_2 f_2 \circ W_2 + \ldots + a_n f_n \circ W_n) \circ (a_1 W_1 + a_2 W_2 + \ldots + a_n W_n)^{-1}$$

where the ○ stands for composition and the morph operation acts on the right (xy space). The mathematic behind the multi-image morphing process is discussed in more detail in Todor Georgiev's Thesis entitled "Morphing Between Multiple Images: Theory and Applications," June 1997, available from the Department of Computer Science in the Graduate School, Southern Illinois University at Carbondale, hereby incorporated by reference.

Referring now to FIG. 5, one implementation of a multi-image morphing process 100 is shown. This is a method for converting any 2-image morphing computer program, that internally uses meshes, into a multi-image morphing program. In mesh warping, the warping functions are approximated by pairs of meshes. In order to do n-image morphing given n pictures, the user builds n meshes (step 102), as discussed in more detail below. The result is control points in the first picture and their corresponding control points across all n pictures. For a given control point on picture 1 and corresponding points on pictures 2 through n, a new point which is a linear combination of all of the above points is generated (points are treated as vectors). The entire process is then repeated for all control points. The result is a mesh that is a "weighted average" of n meshes with weights $a_1 a_2, \ldots, a_n$ (step 104). The weighted average mesh together with the mesh associated with the first picture are used to do the warping in step 110.

Concurrently, in step 106, the 2-image warping process generated by mesh 1 and mesh i is applied to pictures i=1 ... n to generate n warped images from picture 1 onto picture 1, from picture 2 onto picture 1, ..., and from picture n onto picture 1. The n pictures are blended together using coefficients (weights) $a_1, a_2, \ldots, a_n$ in step 108.

The 2-image warping process is then used with the following inputs: the intermediate picture created by step 108, the original mesh on picture 1, and the "weighted average" mesh to generate the multi-image morph (step 110).

The determination of the warping functions $W_i$ is discussed next. In n-image morphing, a correspondence among n images is needed (Step 102). This correspondence may be generated using existing 2-image morphing tools to generate meshes that relate picture 1 and picture 2, picture 1 and picture 3, ... picture 1 and picture n, for a total of n−1 correspondences. W is typically approximated using a mesh correspondence approach. In this approach, key points in the n pictures (one from each picture) are identified by selecting a point in the first picture and corresponding points on the pictures 2 through n. This process is repeated for the remaining key points.

These points on each picture are then connected, forming a fine mesh consisting of small triangles or quadrilaterals, among others. The meshes on the pictures are, generally speaking, deformed. This deformation is captured in a transform done in order to fit the quadrilateral in one picture to the corresponding quadrilateral on another. A number of transforms may be used. A good description can be found in G. Wolberg, "Digital Image Warping", IEEE Computer Society Press, Los Alamitos, Calif. (1990). In general, they take as input an image in a quadrilateral on one picture and produce a deformed image which is fit to the corresponding quadrilateral on the other picture. The quadrilateral warping methods may include bilinear warping, bicubic warping and perspective warping, among others. They all use data from the meshes (corners of source and destination quadrilaterals) as input parameters. The constructed meshes approximate the warping functions $W_i$.

The selection of the coefficients $a_1, \ldots, a_n$ is described next. In most cases the input images are such that at least one point remains the same across all of them. Then, it is natural to expect that this point or points do not move in the morph. This is achieved by imposing the constraint $a_1+a_2+ \ldots +a_N=1$. The above constraint also guarantees that if the initial pictures are significantly different, the morph never collapses into a point or expands to infinity.

Any point in the affine space defined by the above constraint represents a picture (morph). The above space will be referred to as morph space. Any curve in morph space represents a sequence of pictures, or a movie.

The changes between pictures can be represented as vectors in morph space. Given any two points (pictures) in the morph space, the change vector is their difference. These vectors may be used to alter other pictures or to animate pictures. The change vectors may be added or combined to obtain additional changes. Thus, the first picture can be generated by a point in morph space (or corresponding coefficients $a_i$) (1, 0, 0, ..., 0); the second picture can be generated by the point (0, 1, 0, ..., 0), ... and the n-th picture is generated the point (0, 0, 0, ..., 1). The change from the first to the second picture would be represented by the vector $change_{12}=(-1, 1, 0, \ldots, 0)$. There are $n*(n-1)/2$ such changes, but only n−1 of them are independent. The others can be represented as linear combinations of n−1 basis vectors, which can be chosen as $change_{12}$, $change_{13}, \ldots, change_{1n}$. From the above, it can be seen that change vectors have coordinates that add up to zero. Further, by adding a change vector to a point, a new point is generated whose coordinates add up to 1, as it has to be in order to satisfy the constraint.

Change vectors can be used in animation. For example, n pictures of a face to be animated may be used as key points in the morph space. The above basis vectors may be scaled and added to the initial points to produce a visible change proportional to the difference between the corresponding initial pictures (such as pictures with a smiling face and a neutral face). A starting picture is selected and small increments of change vectors with direction and length precisely chosen by the user are added. The increments may include, for example, a 50% smile and 20% surprise in the first frame, a 53% smile and 15% surprise in the next frame, and so on. The resulting animation is generated in an automated way, with directions and behavior fully under the user's control. Validity of the resulting transforms is automatically guaranteed, in other words the constraint always holds and as a result the output pictures are more stable than they are in ordinary morphing.

Turning now to FIG. 6, an example of a transformation which "transports" a facial expression from an image of one person to another is shown. Given an original face 300, which is not smiling, and a smiling face 302 of the same person, a new face 304 of another person can be morphed to simulate the second person's smiling in exactly the same way as the original face 300. In this example, a 2-D morph space for a 3-image morphing (the 3 input images being 300, 302 and 304) is determined by finding the change vector 301 from the neutral face 300 to the smiling face 302 and by applying the 3-image morphing to add the change to the new face 304. The result is a smiling new face 306. By scaling the change vector we can achieve any degree of smiling, even "inverse smiling". The change vector 301 may be applied to any other images. Additionally, a library of facial expressions may be stored as change vectors and applied with different weight factors to achieve modified images whose changes may be minor to gross, ranging from barely perceivable to exaggerated caricatures.

A movie in the above representation is a curve in the morph space, which may be represented as a sequence of change vectors. Given a morphing movie, the acting characters may be easily replaced or altered. For instance, a picture of a new character may be added to the morph space by generating a correspondence to one of the frames. As a result each frame is represented by n+1 parameters, the last one describing the input of the new picture. The addition of a change between a given frame and the new picture to all of the remaining frames shifts the whole movie and changes the appearance of the characters. This process is called "translation".

The most general transform is the affine morphism where the change vector is multiplied by a matrix and a translation is performed. The translation not only replaces the old characters with new ones, but also changes the types of motions they do. These mathematical operations can be used to achieve extremely wide set of possible changes and transformations from one movie to another. The movie can be a real movie or animation. The only condition is that it is represented as a morph, in other words, there is correspondence among all frames.

This is a much more flexible method than the animation technique of "inbetweening," which always combines only two pictures. Often, simple mathematical curves such as sin(x) produce very good results, with little effort.

Further, the color of the picture may be modified so that a black and white picture may be converted into a color picture. In this case, a color picture of a different person of the same race, color of the eyes and hair is taken and converted to black-and-white picture. A 2-D morph space image of 3 pictures is constructed and the inverse vector of change is added to the original black-and-white picture to generate a color version of the original black and white picture.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

FIG. 7 illustrates one such computer system 600, including a CPU 610, a RAM 620, a ROM 622 and an I/O controller 630 coupled by a CPU bus 640. The I/O controller 630 is also coupled by an I/O bus 698 to input devices such as a keyboard 660 and a mouse 670, and output devices such as a monitor 680. The I/O controller 630 also drives an I/O interface 690 which in turn controls a removable disk drive 692 such as a floppy disk, among others.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A computer-implemented method for morphing among multiple images using a predetermined set of coefficients and a plurality of warping functions, each image defined by a plurality of points in a first space, each point having a color, the method comprising:

generating a derived warping function;

determining an inverse of the derived warping function;

warping each image to the first image;

blending the colors using the predetermined set of coefficients;

applying the inverse of the derived warping function to points in the first space to generate a warped image; and applying the blended color to the warped image.

2. The method of claim 1, wherein each warping functions is defined by meshes.

3. The method of claim 1, wherein the number of images is n and wherein n is greater than 2.

4. The method of claim 1, wherein the predetermined set of coefficients sum up to one.

5. The method of claim 4, wherein the predetermined set of coefficients are functions.

6. The method of claim 1, further comprising generating change vectors for pairs of images.

7. The method of claim 6, further comprising applying each change vector to another image by using predetermined weights.

8. The method of claim 7, further comprising automatically generating movies using the change vectors.

9. The method of claim 7, further comprising generating a new character from an existing character in a movie by applying the change vector.

10. The method of claim 7, further comprising transporting gestures and facial expressions from an image of one person to another.

11. The method of claim 7, further comprising converting black-and-white pictures to colored pictures using the change vector.

12. A computer-implemented method for warping multiple images using a predetermined set of coefficients and a plurality of warping functions, each image defined by a plurality of points in a first space, each point having a color, the method comprising:

generating one or more correspondences between n−1 pairs of pictures;

generating a weighted average correspondence mapping;

applying a two-image warp to a first image and each of the remaining images to generate n−1 pictures;

blending the n−1 pictures with the first image; and generating a warped image using the weighted average correspondence mapping and the blended picture.

13. A computer program stored on a computer-readable media for morphing among multiple images using a predetermined set of coefficients and a plurality of warping functions, each image defined by a plurality of points in a first space, each point having a color, the program comprising instructions to:

generate a derived warping function;

determine an inverse of the derived warping function;

warp each image to the first image;

blend the colors using the predetermined set of coefficients;

apply the inverse of the derived warping function to points in the first space to generate a warped image; and apply the blended color to the warped image.

14. The program of claim 13, wherein each warping functions is defined by meshes.

15. The program of claim 13, wherein the number of images is n and wherein n is greater than two.

16. The program of claim 13, wherein the predetermined set of coefficients sum up to one.

17. The program of claim 16, wherein the predetermined set of coefficients are functions.

18. The program of claim 13, further comprising instructions for generating change vectors for pairs of images.

19. The program of claim 18, further comprising instructions for applying each change vector to another image by applying predetermined weights.

20. The program of claim 19, further comprising instructions for automatically generating movies using the change vectors.

21. The program of claim 19, further comprising instructions for generating a new character from an existing character in a movie by applying the change vector.

22. The program of claim 19, further comprising instructions for transporting gestures and facial expressions from an image of one person to another.

23. The program of claim 19, further comprising instructions for converting black-and-white pictures to colored pictures using the change vector.

24. The program of claim 19, further comprising instructions for converting color pictures to black-and-white pictures using the change vector.

* * * * *